United States Patent

[11] 3,587,152

| | | | |
|---|---|---|---|
| [72] | Inventor | Peter Hold |
| | | Milford, Conn. |
| [21] | Appl. No. | 736,506 |
| [22] | Filed | June 12, 1968 |
| [45] | Patented | June 28, 1971 |
| [73] | Assignee | U.S.M. Corporation |
| | | Boston, Mass. |

[54] CONTROLLED DEFLECTION ROLL
4 Claims, 5 Drawing Figs.

[52] U.S. Cl............................................. 29/116,
100/170
[51] Int. Cl........................................ D21g 1/02,
B21b 13/00
[50] Field of Search...........................29/116, 116
(AD), 113 (AD), 113; 100/170, 155, 162 (B);
184/3, 5; 162/348; 308/9; 101/375, 376

[56] References Cited
UNITED STATES PATENTS

| | | | |
|---|---|---|---|
| Re26,219 | 6/1967 | Kusters et al................. | 29/116X |
| 2,395,915 | 3/1946 | Specht.......................... | 29/116X |
| 3,119,324 | 1/1964 | Justus........................... | 100/170 |
| 3,131,625 | 5/1964 | Kusters et al. ................ | 100/170 |
| 3,430,319 | 3/1969 | Skaugen....................... | 100/170X |

FOREIGN PATENTS

| 6,509,484 | 2/1966 | Netherlands................. | 29/116 |

Primary Examiner—Billy J. Wilhite
Assistant Examiner—Leon G. Machlin
Attorneys—Kenyon & Kenyon and Reilly, Carr & Chapin ABSTRACT: The radial-acting pressure-applying means required between the nonrotative shaft and the rotative shell encircling this shaft of a controlled deflection roll assembly, is formed by one or more pistons working in cylinders mounted by this shaft. The one or more pistons each has a hydrostatic bearing pad on its pressure-applying end which works against the inside of the shell roll so that this inside provides the runner of a hydrostatic bearing assembly.

PATENTED JUN28 1971

INVENTOR
PETER HOLD

Kenyon & Kenyon
ATTORNEYS

PATENTED JUN 28 1971

INVENTOR
PETER HOLD
BY
Kenyon & Kenyon
ATTORNEYS

CONTROLLED DEFLECTION ROLL

This invention relates to controlled deflection rolls.

Such a roll includes a nonrotative shaft encircled by a shell roll with radial space between these two parts. The shaft is supported directly or indirectly by the frame or frame members of the machine using the roll and means are provided between the shaft and the inside of the roll for applying radial pressure to the latter from the shaft. With the outside of the shell roll forming a work-rolling nip with a counter roll, the pressure-applying means controls the roll's deflection caused by the work-rolling pressure, this resulting in more or less deflection of the shaft which is immaterial.

The prior art discloses the use of one or more cylinders mounted by or formed in the nonrotative shaft. Each cylinder is provided with a piston, having a bearing on its outer end which bears against the inside of the rotating shell roll.

The Specht U.S. Pat. No. 2,395,915, Mar. 5, 1946, shows the bearing as being formed by a rotative roller. The Justus U.S. Pat. No. 3,119,324, Jan. 28, 1964, shows the bearing as comprising a Kingsbury or Michell bearing, relying on the rotation of the shell roll to form the oil wedge characteristic of this type bearing. The Kusters et al. U.S. Pat. No. 3,131,625, May 5, 1964, shows a bearing provided with pressure lubrication to form the cushion of oil characteristic of this type.

According to the present invention, a hydrostatic bearing is interposed between the outer end of each of the one or more pistons. The hydrostatic bearing's pad piston area is made greater than the piston area of the piston applying the roll deflection controlling pressure, and the pad is supplied with fluid, usually oil, at a fluid pressure substantially equal to that applied to the piston but through the flow restrictor or compensating element required for the operation of a hydrostatic bearing. The inside of the shell forms the bearing runner. One such hydrostatic bearing is applied to each of the pistons used, of which there would ordinarily be a multiplicity extending along the length of the roll to support the latter at a plurality of locations.

When fluid pressure is applied to each of the described hydrostatic bearing and piston assemblies, no piston can force the hydrostatic bearing pad into direct contact with the inside of the shell. Fluid pressure on the inside of each piston forcing it outwardly or radially towards the inside of the shell causes the fluid to flow through the restrictor to the bearing pad having a larger piston area. The fluid escapes from the pad at a rate dependent on the pressure the piston applies to the pad. If the piston pressure increases, the pad moves closer to the shell's inside and chokes off the escape of the fluid so that the pad pressure builds up and keeps the pad separated from the shell's inside, the opposite occurring with a piston pressure decrease. This action is automatic and is independent of the shell's rotative speed on which the Kingsbury or Michell bearing is dependent. It is automatic and independent of the fluid lubricant supply on which the plain sliding bearing type is dependent. It avoids the disadvantages of rollers which require room and form only a line contact with the inside of the shell roll.

Specific examples of the present invention are illustrated by the accompanying drawings in which.

Figure 2:
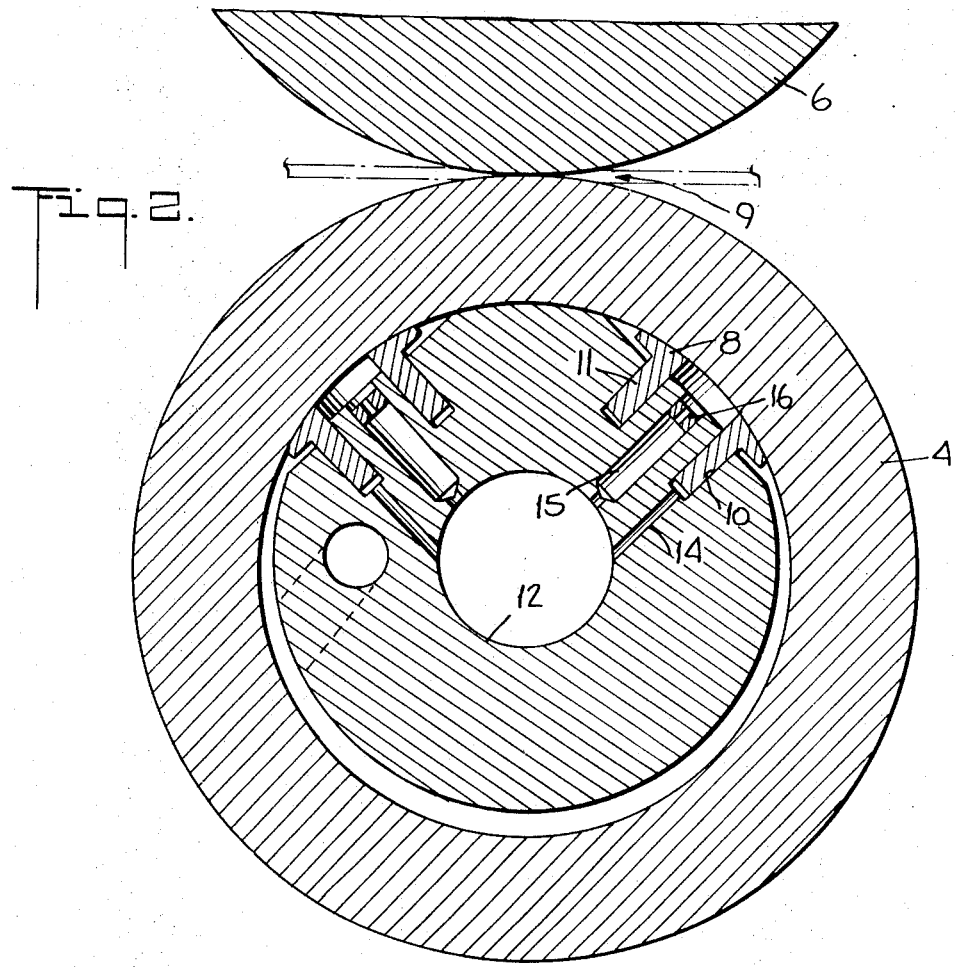
FIG. 2 is a cross section taken on the line 2—2 in FIG. 1.
Figure 3:
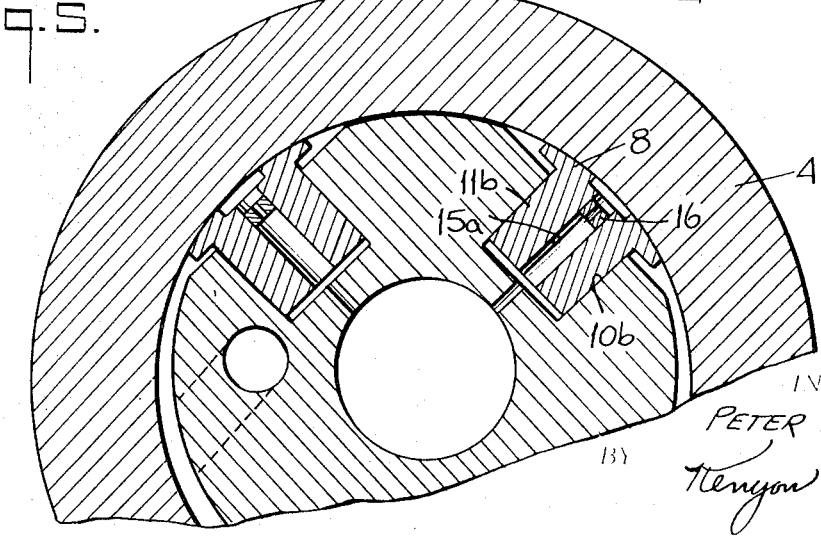

FIG. 5 corresponds to FIG. 2 but shows a second modification.

Figure 1:
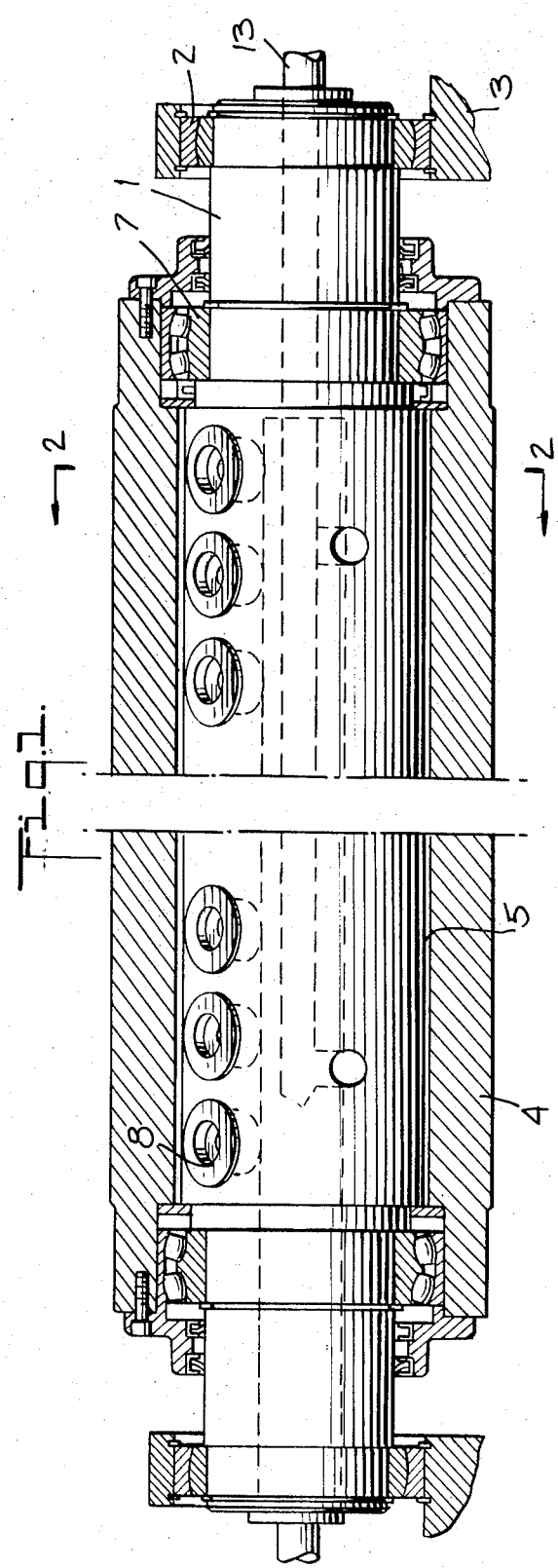
FIG. 1 shows the shell roll and the shaft supports in vertical longitudinal section and with the shaft itself and the hydrostatic bearings in elevation.

Referring to these drawings, FIG. 1 shows the nonrotative shaft 1 having its opposite ends mounted by rocking bearings 2 supported by the frames 3 of the machine using the roll. The shell roll 4 encircles the shaft 1 with radial space 5 therebetween. It is to be understood that when in use, there is a counterroll 6 (for which see FIG. 2) above the roll as it is shown by FIG. 1, and which forms a pressure rolling nip with the shell roll 4, the rolling pressure tending to deflect the shell roll 4 downwardly like a beam flexing under a load. In the present instance, the shell roll is journaled at its opposite ends by self-aligning roller bearings 7, on the shaft 1. The functions of the various pistons and bearings are to control the roll deflection by transferring the deflection force to the shaft 1 where it does not matter so long as the deflection does not use up all of the room made available by the radial space 5 which does not occur with proper engineering.

In FIG. 1 there is a shown multiplicity of hydrostatic bearing pads 8 extending along the length of the inside of the shell roll 4 between the bearings 7.

As shown by FIG. 2, the bearing pads 8 form pairs, of which each two are pressed diagonally outwardly in directions circumferentially spanning the nip 9 formed by the rolls 4 and 6. In this instance, the cylinders 10 are annular and the pistons 11 are correspondingly annular and reciprocate in the cylinders 10. The shaft 1 has an axial passageway 12 for the fluid, usually oil, which applies the radially directed pressure to the pistons 11 and to the hydrostatic bearing pads 8, this passageway being accessible as at 13 from one end of the shaft 1 so that it may be supplied with fluid under pressure. The passageway 12 connects through branch lines 14 with the inner end portions of each of the cylinders 10 behind the pistons 11 so as to force these pistons radially outwardly to apply the pressure required to control the deflection of the roll 4. Also, passageways 15 extend outwardly to the pressure-distributing hollows of the pads 8, each passageway 15 having a flow restrictor or compensating element 16 in series with its flow to the pad's hollow.

Figure 3:
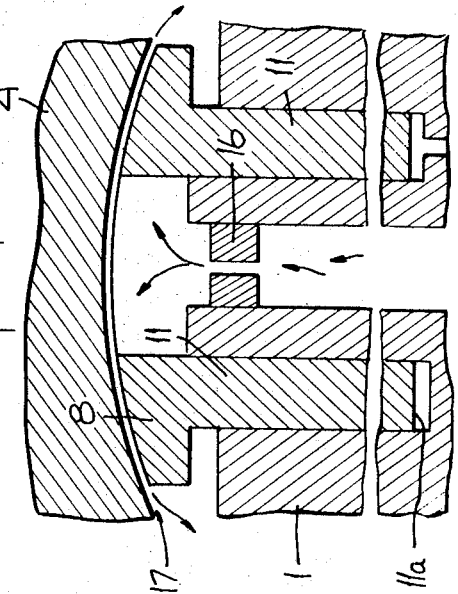
FIG. 3 is an enlargement of one of the bearing pads, taken from FIG. 2.

Now, as shown by FIG. 3, in each instance the fluid applies pressure to the inner end 11a of the piston 11 and forces it radially outwardly, the fluid at the same time flowing through the passageway 15 and the flow restrictor 16 into the hollow of the hydrostatic bearing pad 8. If, as at the start of operations, the pad is in contact with the inside of the shell 4, and since the piston area of the pad 8 exceeds that of the piston's end 11a, the fluid pressure immediately builds up to form flow between the pad 8 and shell 4, to form a space filled with the fluid as indicated at 17 in FIG. 3. As the space 17 becomes greater, the fluid flow through it becomes greater and because of the restrictor 16, the pressure in the pad decreases, all relative to the pressure applied on the end 11a of the piston concerned. Therefore, a condition of equilibrium is quickly established and maintained regardless of the roll deflection controlling pressure required by increasing or decreasing the pressure in the passageway 12 and therefore the pressure applied to each piston's end 11a and, of course, to the bearing pad of the larger piston are through the restrictor or compensating element 16. Thus, it is impossible to force any of the hydrostatic bearing pads into direct metal-to-metal contact with the inside of the shell roll.

Figure 4:
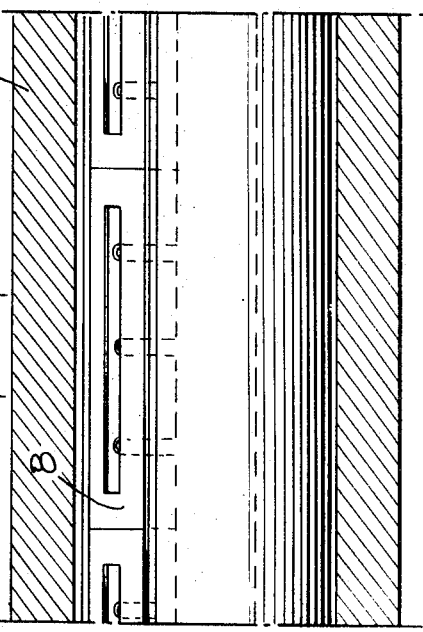
FIG. 4 shows a modification of the bearings as shown in FIG. 1.

FIG. 4 shows a modification wherein the bearing pads 8 are shown at 8a as being linear rather than circular in nature. This type of pad works satisfactorily when it is desired to keep the shell roll straight and free from any deflection.

In the modification of FIG. 5, the pistons 11b are shown as being plain, or substantially solid, instead of annular, with the cylinders 10b in which these pistons reciprocate being correspondingly plain cylinders instead of annular. The passageway 15a is formed directly through the piston 11b to lead to the bearing pad through the restrictor 16. However, the larger piston area of the pad 8 relative to the fluid pressure receiving end of the piston 11b is maintained. It is, of course, to be understood that in this instance also, there may be a plurality of round pistons and bearing pads, or they may be made in the linear fashion represented by FIG. 4.

In all instances, there is the relationship that the pressure necessarily applied to the various pistons, which would ordinarily be uniform as to each piston, although not necessarily so, for the purpose of controlling deflection of the shell roll, is automatically applied through a flow restrictor to the hydrostatic bearing pad which has a larger piston area so that its space or gap between it and the inside of the shell roll and through which the flowing fluid, such as oil, escapes, can never close. Always there will be the fluid, normally oil, between the bearing pad and the inside of the shell regardless of the rotative speed of the shell and even, in fact, if the shell is not rotated. Metal-to-metal contact is avoided independently of any supply of other than the roll pressure deflection controlling fluid. The disadvantages of rollers are avoided.

I claim:

1. A controlled deflection roll having a nonrotative shaft, a shell roll encircling the shaft with radial space therebetween, and means for applying radially directed pressure from the shaft to the inside of the roll to control the latter's deflection which includes at least one radial cylinder in said shaft, a reciprocative piston in said cylinder, a hydrostatic bearing pad on the outer end of the piston and facing said roll's inside, said bearing pad having an area greater than the area of said piston, wherein the improvement comprises manifold conduit means extending generally through said shaft from at least one end thereof for conducting fluid at the general roll deflection controlling pressure to the vicinity of said cylinder and pad, said cylinder being connected directly to said manifold conduit means and thereby to said general roll deflection controlling pressure and said pad being connected through a flow restrictor to the same manifold conduit means and thereby to the same general roll deflection controlling pressure fluid whereby the supply of fluid through said manifold conduit means generates a pressure in said vicinity and causes said pressure in said vicinity to be exerted against the inner surface of said piston's end through said direct connection and causes a reduced pressure proportional to said pressure in said vicinity to be applied between the roll's inside and the pad at the outer end of said piston's end so that, regardless of the fluid applied through said manifold conduit and pressure generated in said vicinity to control the deflection of the shell roll, a hydrostatic bearing film is automatically maintained.

2. The controlled deflection roll of claim 1 in which conduit means for supplying fluid to said flow restrictor is connected to said manifold conduit means closely and immediately adjacent to the conduit means connecting said cylinder to said manifold conduit means.

3. The controlled deflection roll of claim 1 in which said flow restrictor is connected directly to said cylinder and thereby to said same manifold conduit means so that the fluid pressure connected to the flow restrictor is identical to that pressure being exerted against the inner end of said piston.

4. A controlled deflection roll having a nonrotative shaft, a shell roll encircling this shaft with radial space therebetween and means for applying radially directed pressure from the shaft to the inside of the roll to control the latter's deflection which include a plurality of radial cylinders in said shaft, a reciprocative piston in each of said cylinders, a hydrostatic bearing pad on the outer end of each of said pistons and bearing to said roll's inside wherein the improvement comprises manifold conduit means extending throughout said shaft from at least one end thereof to the area adjacent each of said cylinder, piston and hydrostatic bearing pad units, and wherein separate conduit means are provided for interconnecting said manifold conduit and each of a plurality of the cylinders, piston and pad units, said pad of each said unit being connected to said manifold through a flow restrictor, each flow restrictor being separately connected to said manifold conduit through and partially by means of its associated cylinder so that identical pressure supplied to each cylinder and bearing against the inner end of the piston therein is transmitted to the flow restrictor through which fluid is supplied to the pressure pad mounted on the outer end of that same piston whereby it is impossible for the piston carrying the pressure pad to be forced against the shells inside regardless of the fluid pressure condition existing in said cylinder.